United States Patent [19]

Mougin

[11] 4,166,363

[45] Sep. 4, 1979

[54] METHOD OF ENERGY CONVERSION UTILIZING A TUBULAR ICEBERG

[75] Inventor: Georges L. Mougin, Paris, France

[73] Assignee: Societe ITI Ltd., Paris, France

[21] Appl. No.: 884,408

[22] Filed: Mar. 8, 1978

[30] Foreign Application Priority Data

Mar. 8, 1977 [FR] France ................................ 77 06703

[51] Int. Cl.² .............................................. F03G 7/04
[52] U.S. Cl. .................................................... 60/641
[58] Field of Search ........................................ 60/641

[56] References Cited

U.S. PATENT DOCUMENTS

| | | | |
|---|---|---|---|
| 1,493,368 | 5/1924 | Merz | 60/641 |
| 3,896,622 | 7/1975 | Daniello | 60/641 |
| 4,014,279 | 3/1977 | Pearson | 60/641 X |

*Primary Examiner*—Allen M. Ostrager
*Attorney, Agent, or Firm*—George E. Kersey

[57] ABSTRACT

Melted ice stored in a pool hollowed out of the upper surface of a tabular iceberg is used as a cold source and the sea on which the iceberg is floating is used as a hot source for a heat engine. Useful energy is extracted in spite of the low Carnot cycle efficiency and the melting of the iceberg to provide fresh water is accelerated.

8 Claims, 3 Drawing Figures

METHOD OF ENERGY CONVERSION UTILIZING A TUBULAR ICEBERG

The present invention concerns an energy conversion method utilising a tabular iceberg, the upper surface of which incorporates a pool for trapping fresh water.

Tabular icebergs originate exclusively in the Antarctic, where the ice does not advance in the form of tongues, but forms a plateau with a well-defined frontier where it meets the ocean. The Antarctic continent is not encircled by mountains, but is bordered by a rim of ice, part of which is supported on the continental shelf and the rest of which floats upon the surface of the ocean. Under the pressure of the ice inland, this mass of ice is gradually pushed towards the sea, and from time to time tabular icebergs become detached from the ice plateau. Although these can have areas of several square kilometers, they can be towed to the coastal waters of the arid regions of the earth. The height of the submerged portion of a rectangular tabular iceberg is six to eight times the height of the portion above sea level, and the total thickness of the iceberg may be some 250 to 300 meters. The use of tabular icebergs from the Antarctic in the northern hemisphere means that the icebergs must cross the equatorial region lying between the two tropics (46° latitude), a distance of 2,760 nautical miles. This distance may be covered in 2,700 hours at a speed of 0.5 meters per second, which is an economical speed for iceberg transport.

The use of tabular icebergs from the Antarctic as sources of fresh water for the arid regions of the earth requires the use of powerful towing or pushing devices for transporting them across the ocean, resulting in the consumption of large quantities of energy, and also power-consuming equipment if they are to be melted in a period of less than two or three years, the energy available from solar radiation being insufficient to melt the icebergs sufficiently quickly. There is therefore an interest in using the iceberg itself as an energy source for its propulsion across the tropical zone and for accelerating melting of the iceberg in the coastal waters of the arid regions in which the icebergs are used.

The present invention is concerned with devices which enable electrical energy to be produced from an iceberg in tropical regions and the combined use of such devices for propulsion and partial melting of the iceberg.

The energy conversion equipment comprises a device for taking up water from the surface of the sea to supply an evaporator for propane or another gas which is expanded through a turbine driving an alternator and subsequently condensed in a condenser supplied with fresh water from a storage pool hollowed out on the substantially horizontal upper surface of the iceberg, for example by means of the technique disclosed by the present applicants and consisting in slowing melting of the ice along a closed path defining the pool. In other words, the seawater is the hot source and the fresh water in the storage pool the cold source of a heat engine comprising an evaporator, a turbine and a condenser, such machines being known per se.

The heat engine may be located on the iceberg, on a floating platform beside the iceberg, or attached to the side of the iceberg. It should be noted that, unlike heat engines using seawater as a hot source, the cold source is not located underneath the hot source, but floats upon it.

When the heat engine is located on top of the iceberg, the seawater is drawn up by means of a thermosiphon and, if necessary, a trimming pump. The seawater is cooled by its passage through the evaporator, where it heats the gas before it is passed through the turbine. The warmer water tends to rise in the thermosiphon and then, having given up heat to the evaporator, descends as it is more dense by virtue of being at a temperature which, although will go lower than its original temperature, is still above 4° Centigrade, so that the water is more dense. This feature is particularly suited to the production of energy for a self-propelled iceberg, and the heat engine may be mounted on a platform floating in the fresh water contained in the pool hollowed out on the substantially horizontal upper surface of the iceberg, the condenser being submerged in the cold fresh water in this pool.

On the other hand, when the heat engine is mounted on a platform floating beside the iceberg, the cold fresh water from the pool hollowed out on the substantially horizontal upper surface of the iceberg is fed to the platform under gravity, and is fed back to the pool via a thermosiphon and, if necessary, a trimming pump, in so far as the water heated by its passage through the condenser must rise. The cold fresh water from the storage pool hollowed out in the substantially horizontal upper surface of the tabular iceberg is at a temperature between 0° Centigrade and 4° Centigrade. After being heated, that is to say after having taken heat from the condenser, the heated fresh water is heavier than the cold fresh water before being subjected to the heat exchange process.

In a third embodiment of the invention, the heat engine may be attached to the substantially vertical side wall of the tabular iceberg. In this case, water is drawn up from both the hot and cold surfaces by means of respective thermosiphons assisted, if necessary, by a trimming pump.

In all cases, whether the heat engine is placed on top of the iceberg, on a platform floating beside the iceberg, or on the vertical side wall of the iceberg, the energy conversion process produces a net heat flow from the seawater towards the fresh water, the flow of thermal energy being greater than the electrical energy produced by a factor of at least 10 because of the low efficiency of the heat engine resulting from the small difference between the temperatures of the hot and cold sources, this temperature difference being in the region of 20° C. This heat flow contributes to the rapid melting of the iceberg, without the fresh water being lost. By way of example, a self-propelled tabular iceberg 3,000 meters × 750 meters × 250 meters would melt ten percent of its own volume. The corresponding amount of water would be stored in the pool hollowed out of the substantially horizontal upper surface of the iceberg, and would be immediately available on the arrival of the iceberg in the coastal waters of the arid regions where it is to be used.

The invention will now be described in more detail, by way of example only and with reference to the accompanying diagrammatic drawings, in which.

Figure 1:
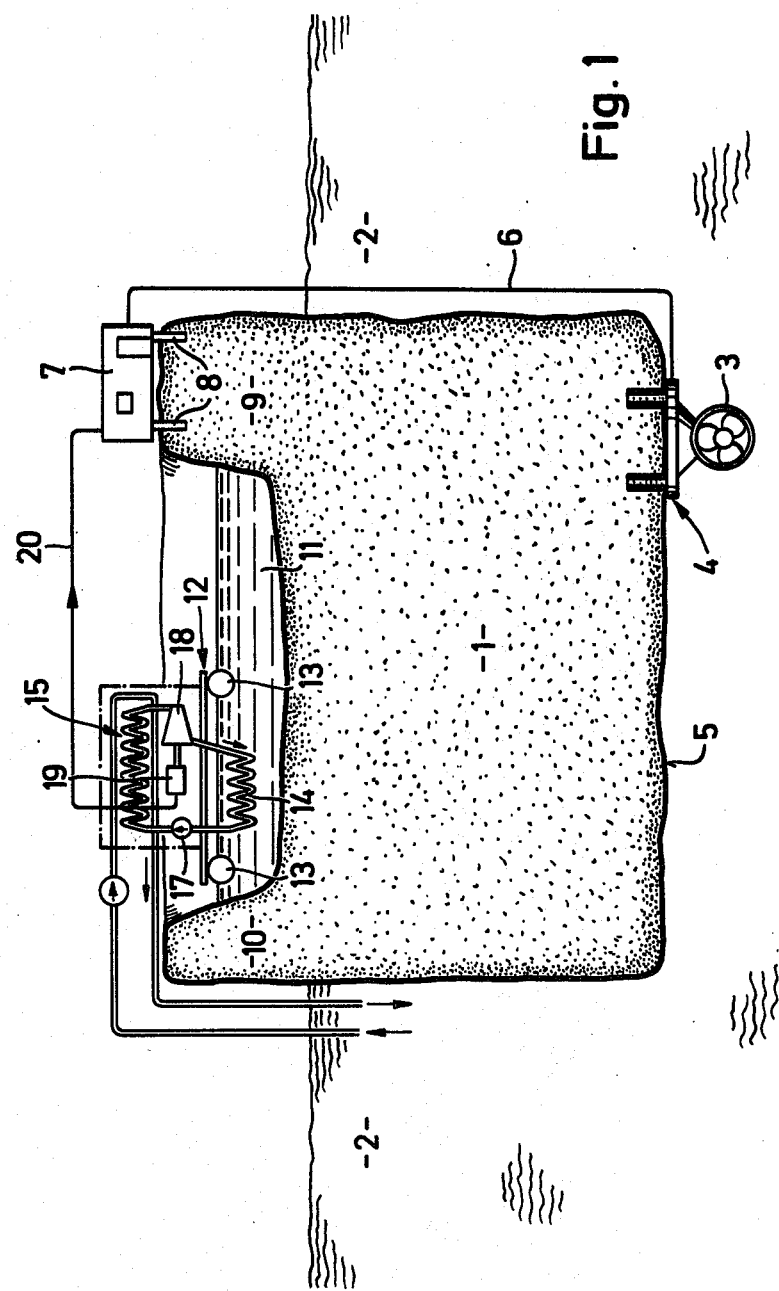
FIG. 1 is a schematic cross-section through a tabular iceberg with a storage pool hollowed out in its substantially horizontal upper surface and filled with fresh water resulting from the melting of the ice of the iceberg, the heat engine for the production of electrical energy floating in said pool.

FIG. 1 shows an iceberg (1) floating in the sea (2) and driven by a propulsion unit (3) which is fixed to the lower portion of an attachment device (4) attached to the substantially horizontal lower surface (5) of the iceberg (1), by means of a method disclosed by the present applicants. The propulsion unit (3) is fed with energy via the electrical cable (6) which runs, with various control systems, from a control station (7) mounted on piles (8) on an island (9) on the iceberg (1). The substantially horizontal upper surface of the iceberg (1) incorporates a pool limited by the island (9) and an edge (10) and hollowed out by means of a technique disclosed by the present applicants. The pool has a horizontal bottom and is filled with fresh water (11). On the surface of the pool floats a platform (12) incorporating flotation units (13) and on which is mounted a heat engine with its condenser (14) submerged in the cold water (11) resulting from the melting of the iceberg (1). Its evaporator (15) is supplied by a thermosiphon assisted by a pump (16) which together draw up water from the surface of the sea (2) which is at a temperature at least 20° C. higher than that of the fresh water (11) in the pool. After passing through the evaporator (15), the seawater is cooled, and therefore more dense, and is returned to the sea (2). A pump (17) assures circulation of the gas for driving a turbine (18) coupled to an alternator (19) between the condenser (14) and the evaporator (15). The alternator (19) produced electrical energy which it delivers to the control station (7) via an electrical cable (20).

Figure 2:
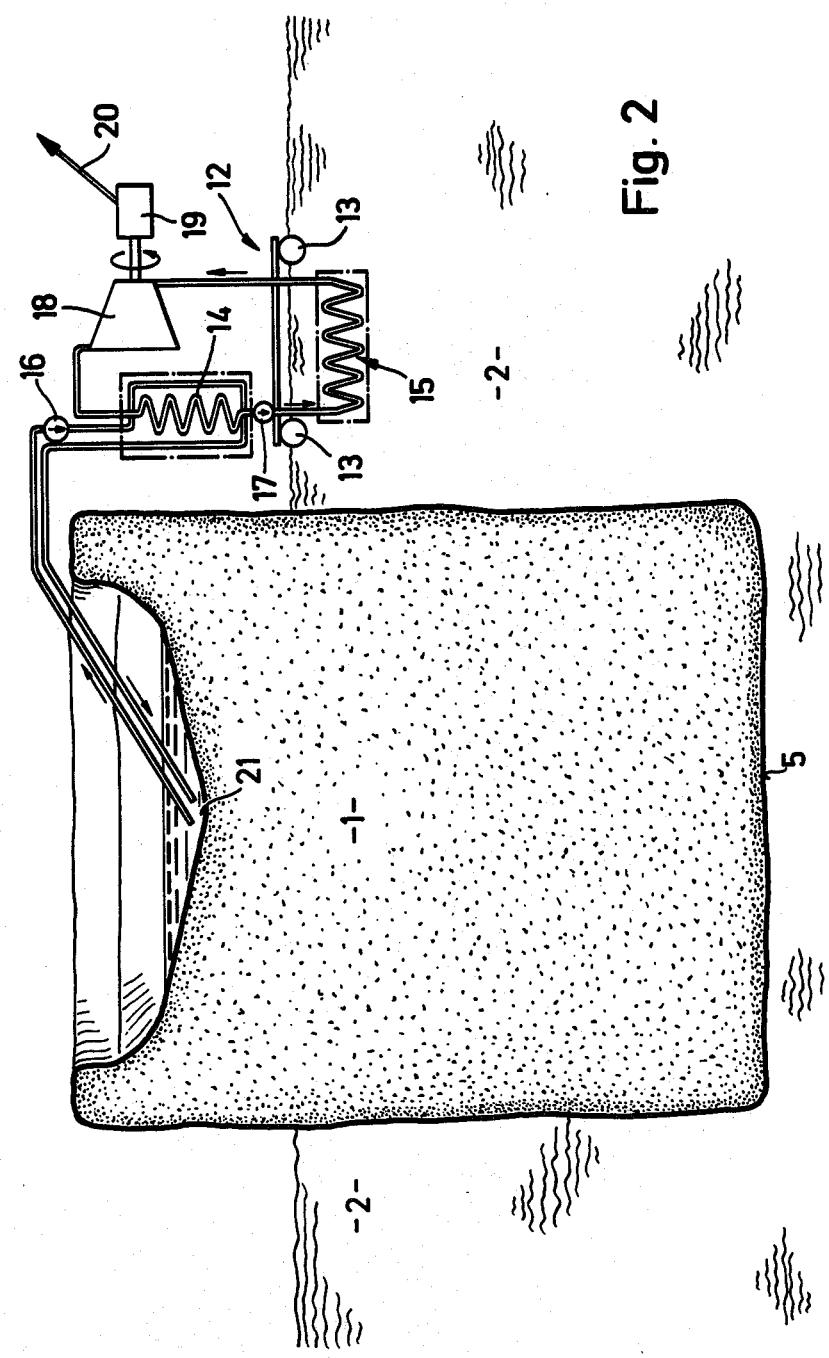
FIG. 2 is a schematic cross-section through a tabular iceberg being used in the coastal waters of an arid region, showing also a heat engine floating on the sea beside the iceberg.

FIG. 2 shows an iceberg (1) floating on the sea (2). Hollowed out from the substantially horizontal upper surface of the iceberg (1) is a pool with a substantially V-shaped bottom containing fresh water (11) produced by the melting of the iceberg (1). The V-shaped bottom of the pool provides a deep area (21) in the pool which facilitates the collection of the fresh water (11). This is drawn up by a thermosiphon assisted by a pump (16) and is passed through a condenser (14) before being returned to the pool hollowed out of the upper surface of the iceberg (1), where it is mixed with the water which is constantly being cooled by continued melting of the iceberg (1). Thus the heating of the water (11) drawn from the pool accelerates the melting of the iceberg without substantially affecting the efficiency of the heat engine. The gas from the evaporator (15) expands through a turbine (18) coupled to an alternator (19) which produces electrical energy which is delivered to the point of use via an electrical cable (20). After passing through the turbine (18), the gas is condensed in the condenser (14) and then passed by a pump (17) to the evaporator (15) which is submerged in the sea (2) on which the platform (12) floats by means of flotation units (13).

Figure 3:
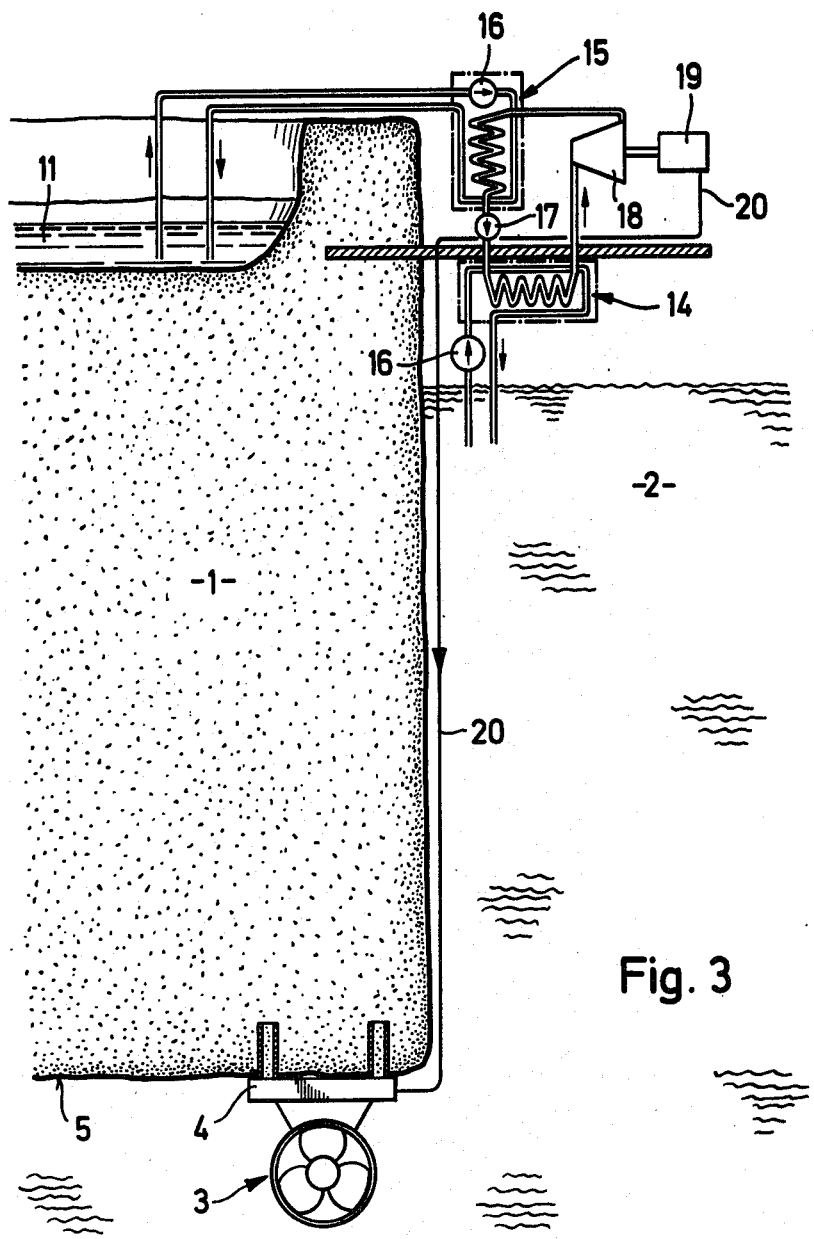
FIG. 3 shows a heat engine attached to the substantially vertical side of a tabular iceberg, with two thermosiphons connecting it to respective cold and hot sources.

FIG. 3 shows a heat engine including a condenser (14) and an evaporator (15), attached to the substantially vertical side wall of an iceberg (1). Cold water (11) is drawn up by a thermosiphon and delivered to the condenser (14), and warm water too is delivered to the evaporator (15) via another thermosiphon. The two thermsiphons are assisted, if necessary, by trimming pumps (16). A gas, such as propane, for example, passes from the condenser (14) via a pump (17) to the evaporator (15). The gas is expanded through a turbine (18) coupled to an alternator (19) which produces electrical energy delivered via cables (20) to a propulsion unit (3) attached to an attachment device (4) fastened to the substantially horizontal lower surface (5) of the tabular iceberg (1).

It will be noted that in the embodiments of the invention shown in FIGS. 1 to 3, the pool hollowed out of the substantially horizontal upper surface of the tabular iceberg (1) provides not only a cold source containing cold fresh water (11) for the heat engine (12) using the sea (2) as the hot source, but also a means of storing the fresh water (11). The method of producing electrical energy using the heat engine (12), which has a low efficiency because of the small difference in temperature between the fresh water of the cold source and the seawater (2), means that the production of a relatively small quantity of electrical energy corresponds to the heating of a relatively large quantity of fresh water (11), which contributes to the efficient melting of the iceberg (1).

The claims defining the invention are as follows:

I claim:

1. A method of energy conversion utilising a heat engine operating with hot and cold sources, wherein the hot source is seawater and the cold source is melted ice stored in a pool hollowed out of the upper surface of a tabular iceberg floating on the seawater.

2. A method according to claim 1, wherein the seawater is drawn from adjacent the surface of the sea by a thermosiphon assisted where necessary by a trimming pump, and passed into a gas evaporator, the evaporated gas then expanding through a turbine which drives an alternator and then being condensed in a condenser which draws fresh water from the pool before being recycled to the evaporator by a pump.

3. A method according to claim 2, wherein the condenser is submerged in the water in the pool.

4. A method according to claim 1, wherein the fresh water is trapped in the pool, drawn up by a thermosiphon, assisted where necessary by a trimming pump, and passed into a gas condenser in which the gas is liquefied before being pumped to an evaporator supplied with the sea water and expanded through a turbine.

5. A method according to claim 4, wherein the evaporator is submerged in the sea water.

6. A method according to claim 1, wherein the heat engine is supplied with fresh water and seawater by two thermosiphons, each assisted where necessary by a trimming pump.

7. A method according to claim 1, wherein the water in the pool hollowed out of the substantially horizontal upper surface of the iceberg acts not only as a cold source for a heat engine using the seawater as the hot source but also as a fresh water reservoir.

8. A method according to claim 1, wherein water is drawn up from one or both sources via a thermosiphon and is returned to the source from which it is taken after being passed through the heat engine.

* * * * *